(12) United States Patent
Chi et al.

(10) Patent No.: US 10,074,842 B2
(45) Date of Patent: Sep. 11, 2018

(54) SECONDARY BATTERY

(71) Applicant: CONTEMPORARY AMPEREX TECHNOLOGY CO., LIMITED, Ningde (CN)

(72) Inventors: Qingkui Chi, Ningde (CN); Kaifu Zhong, Ningde (CN); Lingbo Zhu, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 0 days.

(21) Appl. No.: 15/444,201

(22) Filed: Feb. 27, 2017

(65) Prior Publication Data

US 2017/0271641 A1 Sep. 21, 2017

(30) Foreign Application Priority Data

Mar. 18, 2016 (CN) .......................... 2016 1 0156849

(51) Int. Cl.
*H01M 2/00* (2006.01)
*H01M 2/20* (2006.01)
*H01M 2/34* (2006.01)

(52) U.S. Cl.
CPC ............. *H01M 2/202* (2013.01); *H01M 2/34* (2013.01); *H01M 2200/103* (2013.01)

(58) Field of Classification Search
CPC ... H01M 2/202; H01M 2200/103; H01M 2/34
See application file for complete search history.

(56) References Cited

U.S. PATENT DOCUMENTS

| 9,722,230 B2 * | 8/2017 | Fujiwara | H01M 2/206 |
| 2015/0287974 A1 * | 10/2015 | Choi | H01M 2/305 |
| | | | 429/158 |
| 2017/0025665 A1 * | 1/2017 | Li | H01M 2/043 |

FOREIGN PATENT DOCUMENTS

| CN | 202839828 U | 3/2013 |
| CN | 205376653 U | 7/2016 |

* cited by examiner

*Primary Examiner* — Cynthia Harris Kelly
*Assistant Examiner* — Monique M Wills
(74) *Attorney, Agent, or Firm* — Morgan, Lewis & Bockius LLP

(57) ABSTRACT

The present disclosure provides a secondary battery, which comprises a cap plate, at least two cells and two connecting pieces. The cap plate is provided with two electrode terminals which are opposite in electrical polarity. Each cell has two tabs which are opposite in electrical polarity. Each connecting piece has: an electrode terminal electrical connecting portion for electrically connecting with the corresponding electrode terminal of the cap plate; a plurality of tab electrical connecting portions for electrically connecting with the corresponding tabs of the cells respectively; and a plurality of fusing portions electrically connecting the corresponding tab electrical connecting portion to the electrode terminal electrical connecting portion, a width of each fusing portion is less than a width of the electrode terminal electrical connecting portion. A configuration of the connecting piece is simple, thereby reducing the cumulative heat of the secondary battery and reducing the temperature rise.

7 Claims, 4 Drawing Sheets

SECONDARY BATTERY

CROSS-REFERENCE TO RELATED APPLICATIONS

The present application claims priority to Chinese Patent Application No. CN201610156849.7, filed on Mar. 18, 2016, which is incorporated herein by reference in its entirety.

FIELD OF THE PRESENT DISCLOSURE

The present disclosure relates to a field of a battery technology, and more specifically relates to a secondary battery.

BACKGROUND OF THE PRESENT DISCLOSURE

In the prior art, referring to FIG. 1 and FIG. 2, a secondary battery comprises a cap plate 1, at least two cells 2 and two connecting pieces 3. Each connecting piece 3 has: a tab electrical connecting portion 31 for electrically connecting with a corresponding tab 21 of each cell 2 (such as via welding); an electrode terminal electrical connecting portion 32 connected to the tab electrical connecting portion 31 along a longitudinal direction (referring to FIG. 1 and FIG. 2, the longitudinal direction is parallel to a lengthwise direction L) of the connecting piece 3 for electrically connecting with a corresponding electrode terminal 11 of the cap plate 1 (such as via welding); and a transition portion 35 positioned between the tab electrical connecting portion 31 and the electrode terminal electrical connecting portion 32 and electrically connecting the tab electrical connecting portion 31 and the electrode terminal electrical connecting portion 32. In the secondary battery, in case of thermal runaway of the cell 2, generally, the transition portion 35 between the tab electrical connecting portion 31 and the electrode terminal electrical connecting portion 32 is firstly fused, then the cell 2 and the electrode terminals 11 are electrically disconnected, therefore an electrical circuit between the cell 2 and the electrode terminal 11 are disconnected, however, an electrical connection between the cell 2 and other cell(s) 2 which are electrically connected in parallel cannot be disconnected. For example, when an internal short circuit in one cell 2 occurs first, the one cell 2 will be reversely charged by the other cell(s) 2, a short-circuit current of the one cell 2 becomes larger, more heat is generated and temperature rise increases, therefore the thermal runaway more easily occurs in the one cell 2.

SUMMARY OF THE PRESENT DISCLOSURE

In view of the problems existing in the background technology, an object of the present disclosure is to provide a secondary battery which can reduce cumulative heat of the secondary battery and reduce temperature rise.

Another object of the present disclosure is to provide a secondary battery, in which when an internal short circuit in one cell occurs, the secondary battery can cut off an electrical connection between the one cell and an electrode terminal of a cap plate, thereby preventing the other cell(s) from affecting the one cell and reducing a failure probability of the one cell.

In order to achieve the above objects, the present disclosure provides a secondary battery, which comprises: a cap plate, at least two cells and two connecting pieces. The cap plate is provided with two electrode terminals which are opposite in electrical polarity. Each cell has two tabs which are opposite in electrical polarity. Each connecting piece has: an electrode terminal electrical connecting portion for electrically connecting with the corresponding electrode terminal of the cap plate; a plurality of tab electrical connecting portions which are the same as the cells in number and separated from each other for electrically connecting with the corresponding tabs of the cells respectively, the corresponding tabs of the cells are the same as the corresponding electrode terminal which is electrically connected to the electrode terminal electrical connecting portion in electrical polarity; and a plurality of fusing portions, the fusing portions are the same as the tab electrical connecting portions in number, each fusing portion electrically connects the corresponding tab electrical connecting portion to the electrode terminal electrical connecting portion, a width of each fusing portion is less than a width of the electrode terminal electrical connecting portion.

The present disclosure has following beneficial effects.

In the secondary battery of the present disclosure, the plurality of tab electrical connecting portions of each connecting piece are electrically connected to the corresponding tabs of the cells respectively, the electrode terminal electrical connecting portion of each connecting piece is electrically connected to the corresponding electrode terminal of the cap plate, and the plurality of fusing portions of each connecting piece each electrically connect the corresponding tab electrical connecting portion and the electrode terminal electrical connecting portion respectively, so that the electrode terminal and the corresponding tabs of the cells, which are the same as the electrode terminal in electrical polarity, are electrically connected. A configuration of the connecting piece is simple, the width of each fusing portion of each connecting piece is less than the width of the electrode terminal electrical connecting portion, thereby reducing the cumulative heat of the secondary battery and reducing the temperature rise. For example, when an internal short circuit in one cell occurs, the fusing portions corresponding to the one cell is fused in time, which can cut off the electrical connection between the one cell and the electrode terminal of the cap plate, thereby preventing the other cell(s) from affecting the one cell and reducing the failure probability of the one cell.

Figure 1:
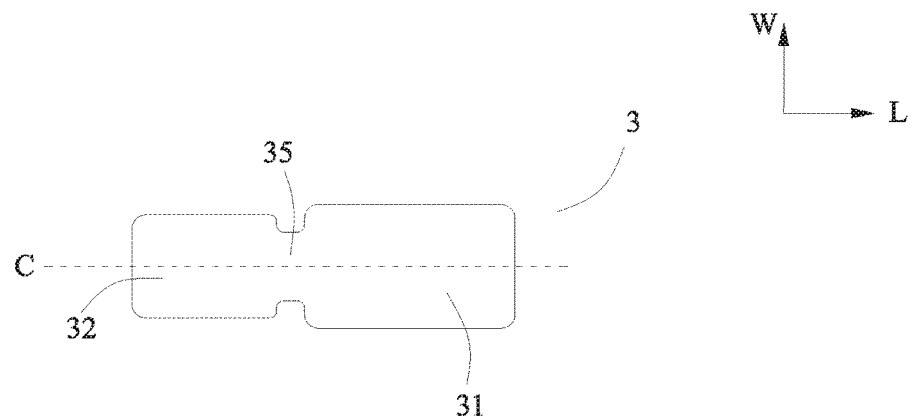
FIG. 1 is a top view of a connecting piece of a secondary battery in the prior art.
Figure 2:
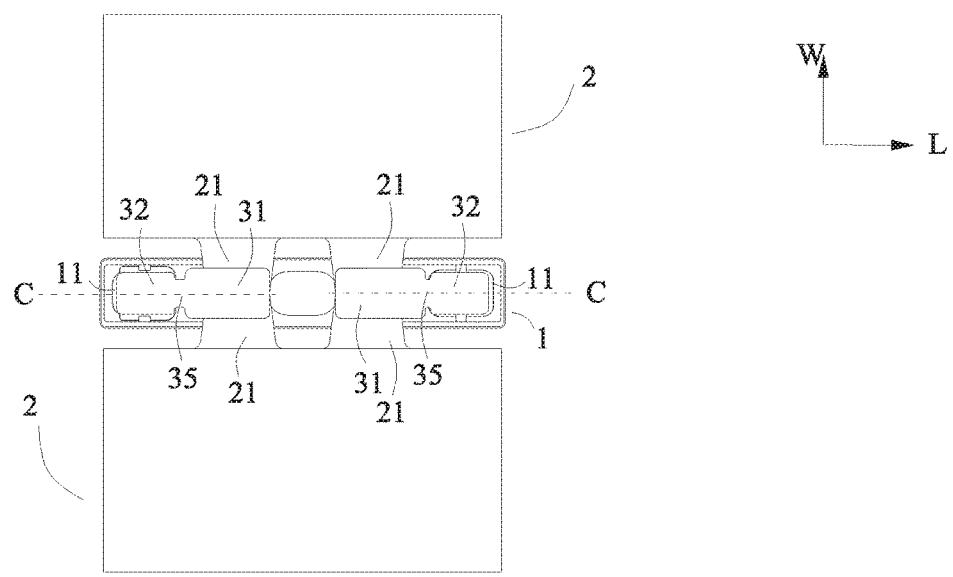
FIG. 2 is a view illustrating a whole electrical connection among the two connecting pieces of the secondary battery in the prior art shown in FIG. 1 and electrode terminals of a cap plate, and tabs of cells.

The reference numerals are as follows:
1 cap plate
11 electrode terminal
2 cell
21 tab
3 connecting piece
31 tab electrical connecting portion
32 electrode terminal electrical connecting portion
d2 width
33 fusing portion
d3 width
34 recessed groove
35 transition portion
d5 width
L lengthwise direction
H thickness direction
W widthwise direction
C central axis

DETAILED DESCRIPTION

Hereinafter a secondary battery according to the present disclosure will be described in detail in combination with the figures.

Referring to FIG. 3 through FIG. 7, a secondary battery of the present disclosure comprises a cap plate 1, at least two cells 2 and two connecting pieces 3. The cap plate 1 is provided with two electrode terminals 11 which are opposite in electrical polarity. Each cell 2 has two tabs 21 which are opposite in electrical polarity. Each connecting piece 3 has: an electrode terminal electrical connecting portion 32 for electrically connecting with the corresponding electrode terminal 11 of the cap plate 1; a plurality of tab electrical connecting portions 31 which are the same as the cells 2 in number and separated from each other for electrically connecting with the corresponding tabs 21 of the cells 2 respectively, the corresponding tabs 21 of the cells 2 are the same as the corresponding electrode terminal 11 which is electrically connected to the electrode terminal electrical connecting portion 32 in electrical polarity; and a plurality of fusing portions 33, the fusing portions 33 are the same as the tab electrical connecting portions 31 in number, each fusing portion 33 electrically connects the corresponding tab electrical connecting portion 31 to the electrode terminal electrical connecting portion 32, a width d3 of each fusing portion 33 is less than a width d2 of the electrode terminal electrical connecting portion 32.

In the secondary battery of the present disclosure, the plurality of tab electrical connecting portions 31 of each connecting piece 3 are electrically connected to the corresponding tabs 21 of the cells 2 respectively, the electrode terminal electrical connecting portion 32 of each connecting piece 3 is electrically connected to the corresponding electrode terminal 11 of the cap plate 1, and the plurality of fusing portions 33 of each connecting piece 3 each electrically connect the corresponding tab electrical connecting portion 31 and the electrode terminal electrical connecting portion 32 respectively, so that the electrode terminal 11 and the corresponding tabs 21 of the cells 2, which are the same as the electrode terminal 11 in electrical polarity, are electrically connected. A configuration of the connecting piece 3 is simple, the width d3 of each fusing portion 33 of each connecting piece 3 is less than the width d2 of the electrode terminal electrical connecting portion 32, thereby reducing the cumulative heat of the secondary battery and reducing the temperature rise. For example, when an internal short circuit in one cell 2 occurs, the fusing portions 33 corresponding to the one cell 2 is fused in time, which can cut off the electrical connection between the one cell 2 and the electrode terminal 11 of the cap plate 1, thereby preventing the other cell(s) 2 from affecting the one cell 2 and reducing the failure probability of the one cell 2.

Figure 4:
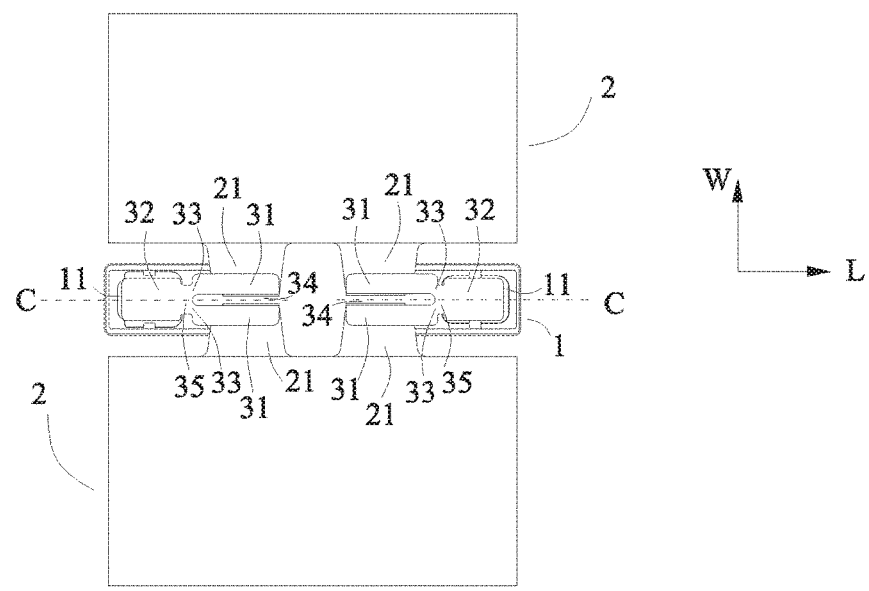
FIG. 4 is a view illustrating a whole electrical connection among the two connecting pieces of the secondary battery of the present disclosure shown in FIG. 3 and electrode terminals of a cap plate, and tabs of cells.
Figure 5:
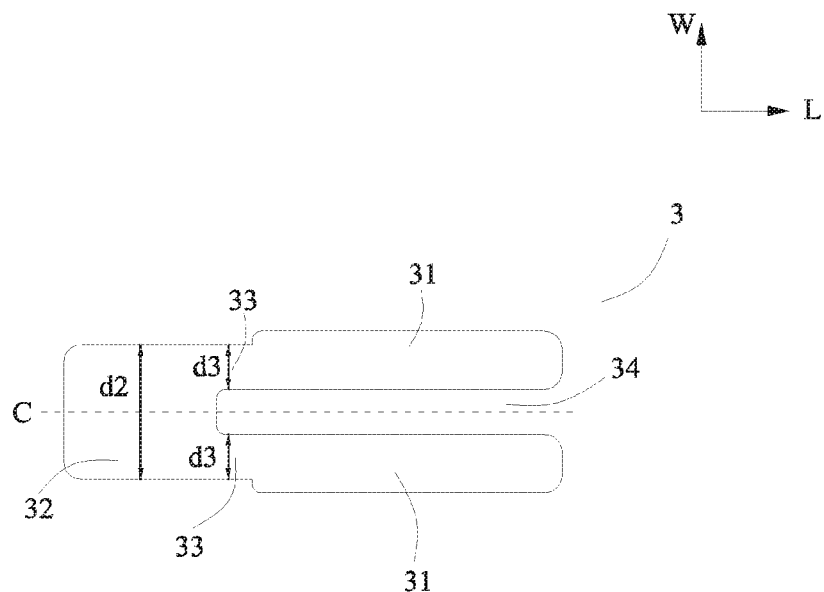
FIG. 5 is a top view of another embodiment of the connecting piece of the secondary battery of the present disclosure.
Figure 6:
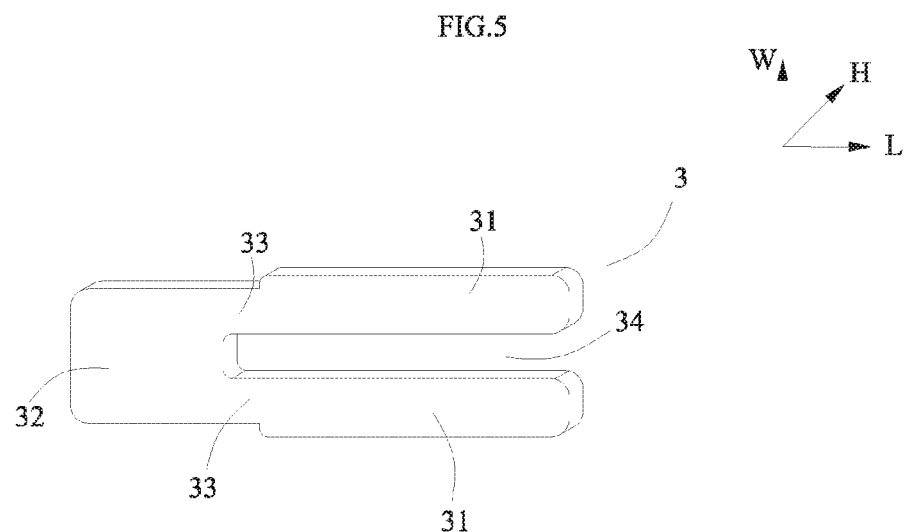
FIG. 6 is a perspective view of the connecting piece of FIG. 5.

In the secondary battery of the present disclosure, in an embodiment, referring to FIG. 4, the number of the cells 2 may be two, the number of the tab electrical connecting portions 31 of each connecting piece 3 may be two, and the two cells 2 are electrically connected in parallel via the two connecting pieces 3.

In an embodiment, referring to FIG. 4, the two cells 2 are symmetrical about a longitudinal central axis C which is parallel to a lengthwise direction L of each connecting piece 3.

In an embodiment, referring to FIG. 3 through FIG. 6, each connecting piece 3 is provided with a recessed groove 34 which penetrates through each connecting piece 3, the recessed groove 34 is positioned between the two tab electrical connecting portions 31, penetrates through each connecting piece 3 along a thickness direction H and extends along the longitudinal central axis C, and opens at one side of the two tab electrical connecting portions 31 which is far away from the electrode terminal electrical connecting portion 32 so as to separate the two tab electrical connecting portions 31 from each other. Each connecting piece 3 is provided with the recessed groove 34, therefore each tab electrical connecting portion 31 is electrically connected to the electrode terminal 11 of the cap plate 1 via the corresponding fusing portion 33 only at one end of each connecting piece 3, so that when an internal short circuit in one cell 2 occurs, the fusing portion 33 corresponding to the one cell 2 can be fused in time, thereby quickly cutting off the electrical connection between the one cell 2 and the electrode terminal 11 of the cap plate 1.

It should be noted that, a direction which is perpendicular to the thickness direction H and the lengthwise direction L at the same time is a widthwise direction W (as shown in FIG. 1 through FIG. 7).

Figure 3:
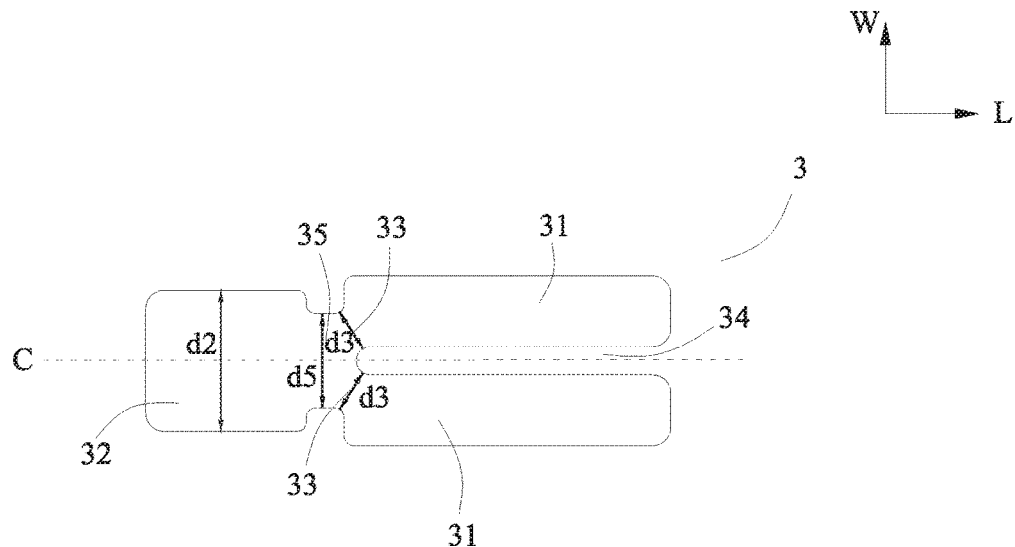
FIG. 3 is a top view of an embodiment of a connecting piece of a secondary battery of the present disclosure.
Figure 7:
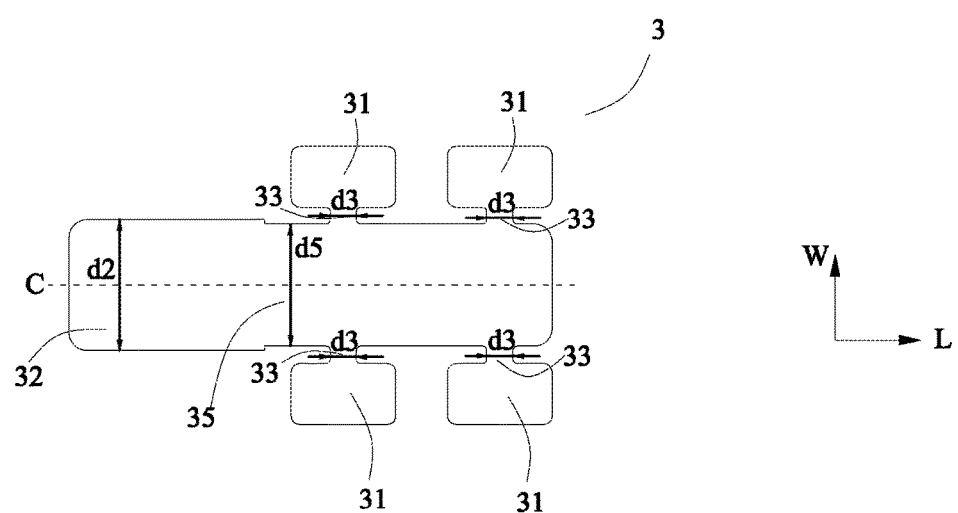
FIG. 7 is a top view of yet another embodiment of the connecting piece of the secondary battery of the present disclosure.

In an embodiment, referring to FIG. 3, FIG. 4 and FIG. 7, each connecting piece 3 further has: a transition portion 35 positioned between the electrode terminal electrical connecting portion 32 and the two tab electrical connecting portions 31, so as to electrically connect the electrode terminal electrical connecting portion 32 and the two tab electrical connecting portions 31, a width d5 of the transition portion 35 is less than the width d2 of the electrode terminal electrical connecting portion 32, the width d3 of each fusing portion 33 is less than the width d5 of the transition portion 35. Because the width d3 of each fusing portion 33 is the smallest, when an internal short circuit in one cell 2 occurs, the fusing portion 33 corresponding to the one cell 2 is firstly fused, thereby quickly cutting off the electrical connection between the one cell 2 and the electrode terminal 11 of the cap plate 1, and reducing the failure probability of the one cell 2.

In an embodiment, referring to FIG. 7, the number of the cells 2 may be two or more, and all the cells 2 are electrically connected in parallel via the two connecting piece 3, a sum of the widths d3 of all the fusing portions 33 of each connecting piece 3 is less than the width d2 of the electrode terminal electrical connecting portion 32 of each connecting piece 3. Because the width d2 of the electrode terminal electrical connecting portion 32 of each connecting piece 3 is more than the sum of the widths d3 of all the fusing portions 33 of each connecting piece 3, when an internal short circuit in one cell 2 occurs, the one cell 2 will not be reversely charged by the other cell(s) 2, thereby preventing thermal runaway occurring in the one cell 2.

In an embodiment, the width d3 of each fusing portion 33 may be same or different.

In an embodiment, the tab electrical connecting portion 31 and the corresponding tab 21 of the cell 2 may be electrically connected via ultrasonic welding. However, the present disclosure is not limited to this, other electrical connection methods may also be used.

In an embodiment, the electrode terminal electrical connecting portion 32 and the corresponding electrode terminal 11 of the cap plate 1 may be electrically connected via laser welding. However, the present disclosure is not limited to this, other electrical connection methods can also be used.

In an embodiment, the connecting piece 3 may be formed as a single metal sheet or metal sheets. Furthermore, when the connecting piece 3 is formed as the metal sheets, a thickness of each metal sheet may be same or different.

In an embodiment, one tab 21 of the cell 2 may be clamped between any two adjacent metal sheets of the connecting piece 3.

Finally, it should be noted that, unless otherwise noted, the connecting piece 3, the tab 21 and the electrode terminal 11 are all electrically conductive. Furthermore, the connecting piece 3, the tab 21 and the electrode terminal 11 may be made from metal.

What is claimed is:

1. A secondary battery, comprising:
   a cap plate provided with two electrode terminals which are opposite in electrical polarity;
   at least two cells, each cell having two tabs which are opposite in electrical polarity; and
   two connecting pieces, each connecting piece having:
      an electrode terminal electrical connecting portion for electrically connecting with the corresponding electrode terminal of the cap plate;
      a plurality of tab electrical connecting portions which are the same as the cells in number and separated from each other for electrically connecting with the corresponding tabs of the cells respectively, the corresponding tabs of the cells being the same as the corresponding electrode terminal which is electrically connected to the electrode terminal electrical connecting portion in electrical polarity; and
      a plurality of fusing portions which are the same as the tab electrical connecting portions in number, each fusing portion electrically connecting the corresponding tab electrical connecting portion to the electrode terminal electrical connecting portion, a width of each fusing portion being less than a width of the electrode terminal electrical connecting portion;
   wherein the cells are electrically connected in parallel via the two connecting pieces,
   each connecting piece is provided with a recessed groove that penetrates through the connecting piece, the recessed groove is positioned between a corresponding pair of tab electrical connecting portions, penetrates through the connecting piece along a thickness direction, extends along a longitudinal central axis of the connecting piece, opens at one side of the corresponding pair of tab electrical connecting portions which is at a distal end from the electrode terminal electrical connecting portion, and separates the corresponding pair of tab electrical connecting portions from each other.

2. The secondary battery according to claim 1, wherein the number of the cells is two.

3. The secondary battery according to claim 2, wherein the two cells are symmetrical about the longitudinal central axis which is parallel to a lengthwise direction of each connecting piece.

4. The secondary battery according to claim 1, wherein each connecting piece further has: a transition portion positioned between the electrode terminal electrical connecting portion and the two tab electrical connecting portions, so as to electrically connect the electrode terminal electrical connecting portion and the two tab electrical connecting portions, a width of the transition portion is less than the width of the electrode terminal electrical connecting portion, the width of each fusing portion is less than the width of the transition portion.

5. The secondary battery according to claim 1, wherein the number of the cells is more than two;
   a sum of the widths of all the fusing portions of each connecting piece is less than the width of the electrode terminal electrical connecting portion of each connecting piece.

6. The secondary battery according to claim 5, wherein the width of each fusing portion are same or different.

7. The secondary battery according to claim 1, wherein the connecting piece is formed as a single metal sheet or metal sheets.

* * * * *